(12) United States Patent
Mitamura

(10) Patent No.: US 7,712,972 B2
(45) Date of Patent: May 11, 2010

(54) OPTICAL RECEPTACLE

(75) Inventor: Nobuaki Mitamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/779,330

(22) Filed: Jul. 18, 2007

(65) Prior Publication Data

US 2008/0124029 A1    May 29, 2008

(30) Foreign Application Priority Data

Aug. 23, 2006   (JP) .............................. 2006-227197

(51) Int. Cl.
*G02B 6/36* (2006.01)
*G02B 6/38* (2006.01)
(52) U.S. Cl. .............................. 385/78; 385/72; 385/76
(58) Field of Classification Search .................... 385/78
See application file for complete search history.

(56) References Cited

U.S. PATENT DOCUMENTS

2006/0274998 A1 *  12/2006  Ito et al. ........................ 385/92

FOREIGN PATENT DOCUMENTS

| JP | 2004-294906 | 10/2004 |
| JP | 2004-317848 | 11/2004 |
| JP | 2005-181903 | 7/2005 |

\* cited by examiner

*Primary Examiner*—Uyen-Chau N Le
*Assistant Examiner*—Kajli Prince
(74) *Attorney, Agent, or Firm*—Staas & Halsey LLP

(57) ABSTRACT

The present invention relates to an optical receptacle which prevents the occurrence of a large impact by collision of a plug body with an optical propagation member. The optical receptacle includes a solid sleeve having a cavity hole into which the plug body is inserted from its one end side and which has an even inner diameter so as not to substantially define a gap with respect to an outer diameter of the plug body and an optical propagation member fixedly secured to the other end side of the cavity hole, with the solid sleeve being formed such that a length from an end portion of the cavity hole on the plug body insertion side to the optical propagation member is longer than a maximum length of extension due to the elastic body of the terminal member.

10 Claims, 8 Drawing Sheets

OPTICAL RECEPTACLE

BACKGROUND OF THE INVENTION

1) Field of the Invention

The present invention relates to an optical receptacle suitable for use in TOSA (Transmitter Optical Sub Assembly) or ROSA (Receiver Optical Sub Assembly) to be mounted in a pluggable type optical transceiver module such as SFP (Small Form-Factor Pluggable) or XFP (10 Gigabit Small Form-Factor Pluggable).

2) Description of the Related Art

In recent years, along with the establishment of the MSA (Multi Source Agreement) for a pluggable type optical transceiver module such as SFP or XFP, it has come into widespread use in optical communication systems based upon SONET/SDH (Synchronous Optical NETwork/Synchronous Digital Hierarchy) and Ethernet (registered trademark). In this pluggable type optical transceiver module, optical assemblies with transmission and reception functions, such as TOSA (Transmitter Optical Sub Assembly) and ROSA (Receiver Optical Sub Assembly), are mounted in packages specified in dimension according to the MSA.

For example, as shown in FIG. 7, a TOSA 100 for the SFP is made up of a semiconductor laser element (hereinafter referred to as an LD element) 101, lenses 102 and 103 for forming a laser beam, emitted from the LD element 101 into a parallel light and a focused light, a package 104 for mounting parts including other electronic parts and a component comprising an optical receptacle 105 for making the connection and introduction of the laser beam to and into a optical connector plug (in the case of the SFP, an LC connector plug, see reference numeral 130 in FIG. 14).

The optical receptacle 105 includes a fiber stub 108, a holder 109 made of a metal or the like, a tubular sleeve 110 and a sleeve case 111 made of a metal or the like. The fiber stub 108 is constructed in a manner such that an optical fiber 107 mainly made of a quartz glass is fixedly inserted into a through hole made in a cylindrical ferrule 106 made of a ceramic material such as zirconia.

In addition, the optical receptacle 105 has a structure in which a rear end side of the fiber stub 108 is inserted into the holder 108, made of a metal or the like, under pressure to be fixed there in and a portion of a cylindrical part forming the sleeve 110 is inserted into a tip side to be embedded therein. Moreover, for preventing the sleeve 110 from protruding, the sleeve case is provided outside the sleeve 110, and this sleeve case 111 is also inserted into the holder 109 to be integrated therewith.

Furthermore, for example, as shown in FIG. 8, an ROSA 120 for the XFP includes an optical receptacle 112 for making a connection of an optical connector plug (in the case of the XFP, an LC connector plug; see reference numeral 130 in FIG. 9), a semiconductor light-receiving element (hereinafter referred to as a PD element) 113, a lens 114 for focusing a laser beam from the optical connector plug on the PD (Photo Diode) element 113 and a package 115 for mounting parts including other electronic parts.

The optical receptacle 112 shown in FIG. 8 has an example of a structure different from that of the optical receptacle 105 shown in FIG. 7, and it includes a tubular sleeve 117, a transparent glass plate 116 fixedly secured through adhesion or the like to an inner surface of the sleeve 117, a sleeve case 119, and a holder 118 for making the precise fixing for integration between the sleeve 117 and the sleeve case 119.

On the other hand, as shown in FIG. 9, an optical connector plug (terminal member) 130 is inserted and fitted in the optical receptacle 105 or 112 of the TOSA 100 or the ROSA 120, and it includes a plug ferrule (plug body) 122 where an optical fiber 121 is inserted into a through hole made in its own central portion, a spring 123, which is an elastic body, for making a close adhesion between the plug ferrule 122 and the fiber stub 108 or the glass plate 116 in a manner such that the plug ferrule 122 is physically pressed against the fiber stub 108 or the glass plate 116 by a predetermined force, and a plug housing 124 for accommodating these parts internally.

In recent years, along with the widespread use of the pluggable type optical transceiver module such as SFP or XFP in the field of data communications such as Ethernet, there is a requirement for no occurrence of problems on performance even when it is handled as well as conventional electric connectors. In particular, an increase in the number of optical lines or the number of optical fiber cords encounters an increase in the weight of a plurality of optical fiber cords bundled, so there is a need for almost no variation of the characteristic even if a load is imposed on the optical fiber cord which is in a connected condition. Concretely, for example, there is a need to satisfy a specification in which, for example, the optical output fluctuation in the TOSA (or the reception sensitivity in the ROSA) is within a predetermined variation range (below 1 dB) when a predetermined load (for example, 100 gf) is applied to an optical fiber cord.

For reducing this characteristic variation at the application of a load to the cord, in addition to the structure of a housing of the pluggable type optical transceiver module, it is considered that the structure of an optical receptacle of an optical sub assembly such as the TOSA, particularly a sleeve (see reference numerals 110 and 117 in FIGS. 7 and 8) in the optical receptacle, fulfills an extremely important role. The sleeves commonly put into practical use are roughly classified into a slit sleeve 141 shown in FIG. 10 and a precision sleeve (solid sleeve) 142 shown in FIG. 11.

The slit sleeve 141 shown in FIG. 10 is, in the literature, of a type that a split (slit) 141a is made in a tubular sleeve 141, and the inner diameter R1 of the slit sleeve 141 is set to be slightly smaller than the outer diameters of a fiber stub (see reference numeral 108 in FIG. 7) and a plug ferrule (see reference numeral 122 in FIG. 9). Therefore, the fiber stub and the plug ferrule (see FIG. 9) can be inserted into the slit sleeve 141 by a predetermined force and, after the insertion thereinto, the plug ferrule can be held by its elastic force (closing force against an opening force on the split 141a).

Taking note of the optical receptacle 105 shown in FIG. 7, since the fiber stub 108 is inserted into the holder 109 under pressure and fixed therein, when the slit sleeve 141 shown in FIG. 10 is fitted in both the fiber stub 108 and the inserted plug ferrule 122, the plug ferrule 122 is aligned (lined up) along an outer circumference of the fiber stub 108 by the elastic force of the slit sleeve 141, which enables the axial alignment between optical fibers 107 and 121 which lie at the central portions of both the fiber stub 108 and the plug ferrule 122.

It is not necessarily preferable that the slit sleeve 141 has a higher elastic force. That is, an excessive elastic force enhances a force (usually, a force needed for drawing out the plug ferrule 122, and referred to withdrawal power) needed for the insertion and extraction of the plug ferrule 122. The enhancement of the withdrawal power makes it difficult for the plug ferrule 122 to abut against the fiber stub 108 by the force of the spring 123 as mentioned above, so the plug ferrule 122 and the fiber stub 122 does not reach the close adhesion, which can cause the occurrence of reflection and coupling loss. For this reason, according to the rules such as IEC (International Electrotechnical Commission) and FOCIS (Fiber Optic Connector Intermateability Standards), for example, in the case of an LC connector, the withdrawal power is set to be 1 to 2.5N in order to avoid the excessive power.

On the other hand, the precision sleeve 142 has no slit as shown in FIG. 11, and the inner diameter R2 thereof is precisely processed to be slightly larger than the outer diameters of the fiber stub 108 and the plug ferrule 122. Accordingly, the axial alignment between optical fibers in the fiber stub 108 and the plug ferrule 122 can be made precisely with an accuracy of approximately 1 μm.

A description will be given hereinbelow of a behavior in a case in which, assuming that an optical connector plug 130 is connected to the TOSA 100 shown in FIG. 7, a load is applied to an optical fiber cord coupled to the optical connector plug 130. The optical connector plug 130 somewhat moves backwards when the plug ferrule 122 abuts against the fiber stub 108 at the insertion (fitting) into the TOSA 100 and, in this state, in most cases, the optical connector plug 130 does not come into contact with any portion within the plug housing 124, that is, it is in a so-called floating state.

However, a large load is applied to a fiber cord, the floating state breaks so that a portion of the load can be applied directly to the plug ferrule 122 as shown in FIG. 12. In such a state, when the slit sleeve 141 shown in FIG. 10 is used as the sleeve 110 for the optical receptacle 105, since the elastic force of the slit sleeve 141 becomes smaller than the load of the plug ferrule 122, thus the split 141a of the sleeve 141 may be opened so that the axis of the optical fiber 121 within the plug ferrule 122 shifts from the axis of the optical fiber 107 included in the fiber stub 108.

In such a situation, a coupling loss occurs, and in the case of the TOSA, the optical output fluctuates. Thus, in the case of the slit sleeve 141, due to its structure, the slit sleeve 141 can fall into an excessively opened state (its diameter increases) when a load exceeding a predetermined value is applied to the plug ferrule 122, thereby enhancing the characteristic variation at the application of a load to the cord.

On the other hand, the precision sleeve 142 has no slit as mentioned above and, even if a load exceeding a predetermined value is put on the plug ferrule 122, the sleeve 142 does not fall into an opened state (no enlargement of the diameter) except that the precision sleeve 142 breaks down, so the characteristic variation at the application of a load to a cord in the case of the precision sleeve 142 becomes better in comparison with the slit sleeve 141. In particular, in a case in which there is a need to reduce the characteristic variation at the application of a load to the cord, the precision sleeve 142 is sometimes put to use.

As other conventional techniques related to the invention of the subject application, there are techniques disclosed in the following Patent Documents 1 and 2.

The Patent Document 1 discloses a technique on a sleeve structure having an elastic section where a slit is made in a longitudinal direction and a rigid section with no slit which is caulked with a gripping ring.

In addition, the Patent Document 2 discloses a structure of a precision sleeve in which a slit (split) having a width at its central portion wider than a width at its open-end portion is formed from the open-end portion to the central portion in a longitudinal direction.

Patent Document 1: Japanese Patent Laid-Open No. 2004-317848

Patent Document 2: Japanese Patent Laid-Open No. 2005-181903

However, the inventor of the subject application found that the precision sleeve 142 has the following problems.

In the case of the precision sleeve 142, since its inner diameter is larger by only several μm than the outer diameters of a fiber stub and a plug ferrule as mentioned above, the coupling therebetween is not easy. For this reason, in a case in which, for example, it is constructed as the sleeve 110 of the optical receptacle 105 as shown in FIG. 12, if the optical connector 122 is obliquely inserted into the optical receptacle 105, the tip portion of the plug ferrule 122 gnaws on an entrance portion of the precision sleeve 142 to be caught thereon (see A1 in FIG. 12).

If the insertion of the optical connector plug 130 is further made in a state where the tip portion of the plug ferrule 122 is caught on the entrance portion of the sleeve 110 serving as the precision sleeve, the spring 123 within the optical connector plug 130 is contracted so as to push the plug ferrule 122 into the interior. Thus, when the insertion angel of the optical connector plug 130 is changed as shown in FIG. 13 in the state of the contraction of the spring 123 in the optical connector plug 130, the catching of the plug ferrule 122 is removed (see A2 in FIG. 13), and the plug ferrule 122 is inserted into the sleeve 110 serving as the precision sleeve.

In this case, since the plug ferrule 122 is powerfully inserted thereinto by the force of the contracted spring 123, as shown in FIG. 14, the plug ferrule 122 can violently come into collision with a surface of the fiber stub 108 (see A3 in FIG. 14). At this time, there is a problem in that a large impact exceeding, for example, 10,000 G occurs since the ferrules 106 and 122 made of a hard material such as zirconia come into collision with each other.

Such a large impact leads to that the fiber stub 108 inserted under pressure settles down or the performance of precise electronic parts mounted in the interior of the package 104 suffers degradation. Even in the case of the optical receptacle 112 mentioned above with reference to FIG. 8, almost same problem arises, and the plug ferrule 122 violently comes into collision with a surface of the glass plate 116 so as to produce a large impact exceeding 10,000 G. Such a large impact affects the performance of precise electronic parts mounted in the interior of the package 115. Incidentally, in the case of the optical receptacle 112 shown in FIG. 8, the glass plate 116 and the sleeve 117 are fixed to each other through an adhesive, and the glass plate 116 does not settle down.

In this case, hypothetically, if it is possible to remove the spring 123 on the optical connector plug 130 side, the above-mentioned problems are solvable. However, as mentioned above, the spring 123 is essential for physically bringing the plug ferrule 122 into contact with the fiber stub 108 or the glass plate 116 by a predetermined force to establish the close adhesion therebetween. No employment of the spring 123 makes it difficult to bring the plug ferrule 122 into contact with the fiber stub 108 or the glass plate 116, which leads to the occurrences of reflection and coupling loss. Therefore, the spring 123 itself is an essential member and is necessary.

SUMMARY OF THE INVENTION

The present invention has been developed in consideration of the above-mentioned problems, and it is therefore an object of the invention to provide an optical receptacle with a simple structure, which avoids the occurrence of a large impact by preventing a plug body from coming into collision with an optical propagation member such as a fiber stub or a glass plate due to a force of an elastic body of a terminal member at the insertion of the terminal member while reducing a characteristic variation at the application of a load to a cord.

For this purpose, an optical receptacle according to the present invention is adapted to accept a terminal member for optical coupling, which the terminal member has a plug body through which a first optical fiber passes and an elastic body adapted to make the plug body extensible and contractible in a direction of the passing of the first optical fiber, and the optical receptacle comprises a solid sleeve having a cavity hole into which the plug body is inserted from its one end side and which has an even inner diameter so as not to substantially define a gap with respect to an outer diameter of the plug body and an optical propagation member fixedly secured to the other end side of the cavity hole, wherein the solid sleeve is formed such that a length from an end portion on the plug body insertion side in the cavity hole to the optical propagation member is longer than a maximum length of extension due to the elastic body of the terminal member.

It is also appropriate that the solid sleeve is formed such that the length from the end portion on the plug body insertion side in the cavity hole to the optical propagation member is longer than a maximum extension length by the elastic body of the terminal member plus a length of a chamfered portion formed at a tip portion of the plug body.

In this case, it is also acceptable that the optical propagation member is made with a ferrule through which a second optical fiber optically coupled to the first optical fiber passes, or that the optical propagation member is made with a glass member.

In addition, preferably, a sleeve case for protecting and fixing the solid sleeve is provided at an outer edge portion of the solid sleeve, and the solid sleeve and the sleeve case are integrated with each other as a single unit.

Still additionally, the solid sleeve is made of zirconia or crystallized glass, and the optical receptacle is made to be of an LC type and a length from a chamfer end point of the plug body insertion side end portion in the cavity hole to the optical propagation member is set to be in a range from 3.1 mm to 4.1 mm.

Yet additionally, preferably, the optical receptacle is made to be of an LC type and an inner diameter of the cavity hole in the solid sleeve is set to be in a range from 1.250 mm to 1.252 mm.

Moreover, it is also appropriate that the optical receptacle is mounted in an optical transceiver module which carries out transmission/reception of an optical signal.

Thus, as an advantage, the present invention can provide an optical receptacle with a simple structure, which avoids the occurrence of a large impact due to the collision of a plug body with an optical propagation member by a force of an elastic body of an optical connector plug at the insertion of the optical connector plug while reducing a characteristic variation at the application of a load to a cord.

DESCRIPTION OF THE PREFERRED EMBODIMENTS

Embodiments of the present invention will be described hereinbelow with reference to the drawings.

The present invention is not limited to the embodiments described below. In addition to the above-mentioned object of the present invention, other technical problems, means for solving these technical problems and advantages will become apparent through the disclosure of the following embodiments.

[a] Description of First Embodiment of the Present Invention

Figure 1:
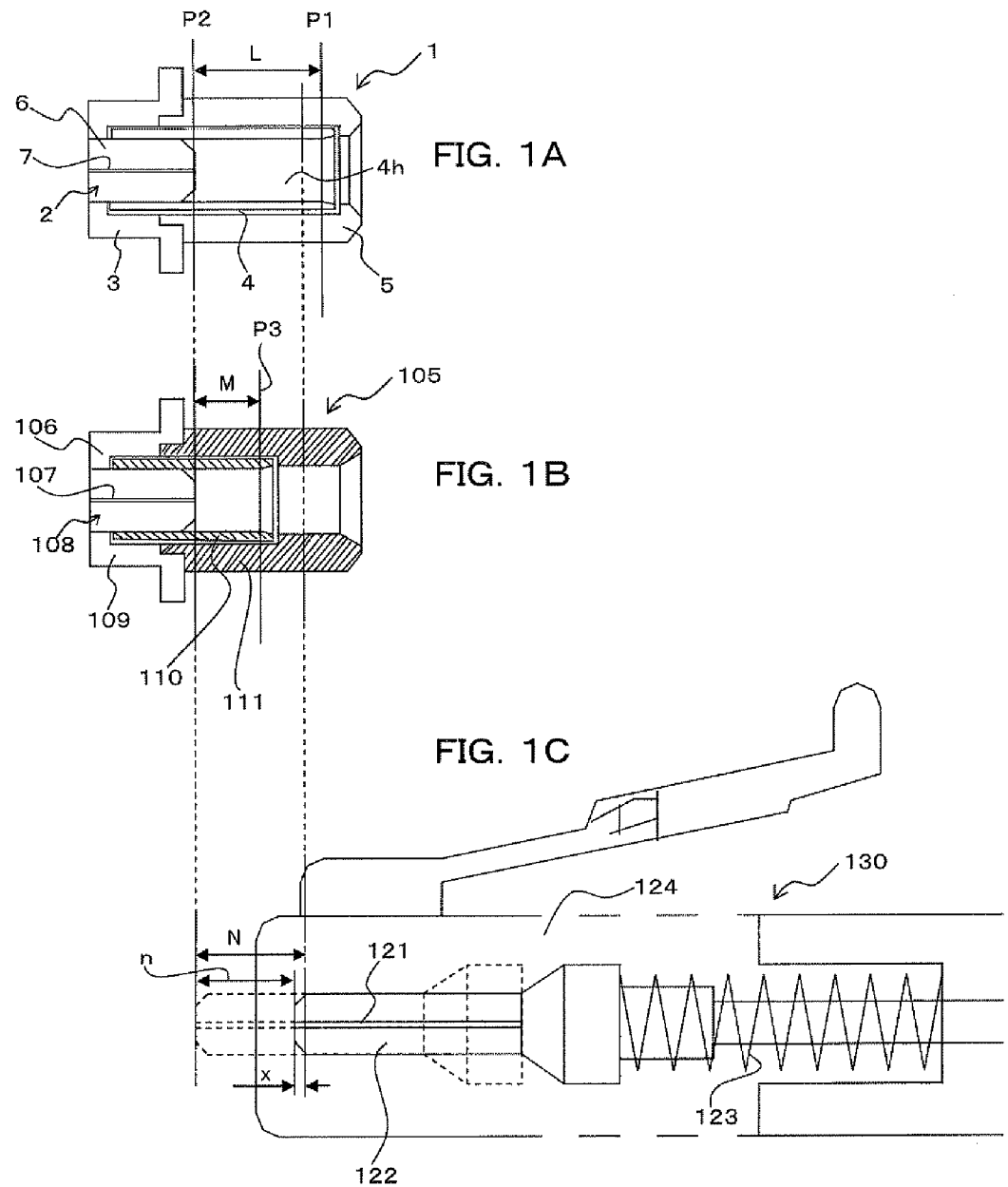
FIG. 1A is a cross-sectional view showing an optical receptacle according to a first embodiment of the present invention.
FIG. 1B is a cross-sectional view showing an example of a structure of an optical receptacle based upon a conventional technique.
FIG. 1C is a cross-sectional view showing an expansion/contraction length of a plug ferrule in a common optical connector plug.
Figure 9:
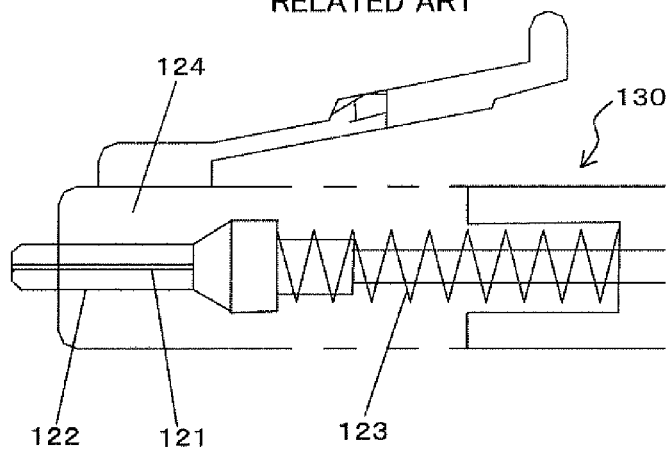
FIG. 9 is a cross-sectional view showing a structure of a common optical connector plug.
Figure 10:
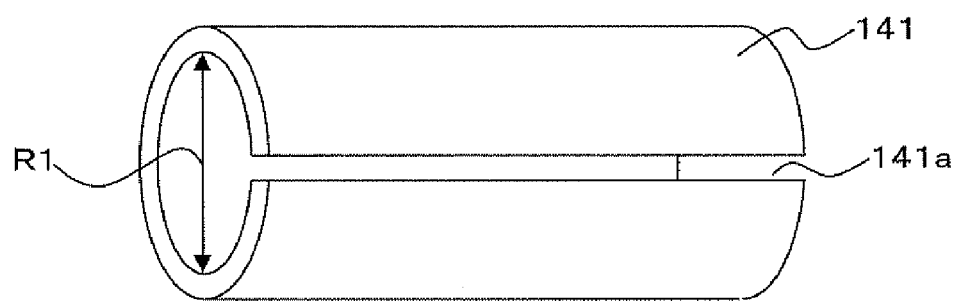
FIG. 10 is a cross-sectional view showing a structure of a slit sleeve based upon a conventional technique.
Figure 11:
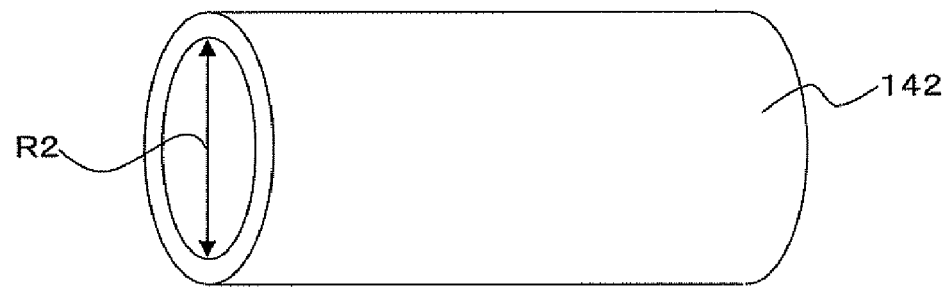
FIG. 11 is a cross-sectional view showing a structure of a precision sleeve based upon a conventional technique.

FIG. 1A is a cross-sectional view showing an optical receptacle 1 according to a first embodiment of the present invention, and FIG. 1C is a cross-sectional view showing an optical connector plug 130 to be inserted into the optical receptacle 1. The optical receptacle 1 according to the first embodiment is applicable as an optical receptacle for an LC connector for use in a TOSA and ROSA to be mounted in a pluggable type optical transceiver module such as an SFP or XFP. That is, the optical receptacle 1 can accept an terminal member such as the optical connector plug 130 shown in FIG. 1C (FIG. 9) for optical coupling.

As mentioned above, the optical connector plug 130 includes a plug ferrule 122 which is a plug body through which a first optical fiber 121 passes, a spring 123 which serves as an elastic body whereby the plug ferrule 122 is extensible and contractible in a direction of the passing of the first optical fiber, and a plug housing 124 for internally accommodating these parts 122 and 123.

The optical receptacle 1 according to the first embodiment includes a fiber stub 2, a holder 3 made of a metal, a precision sleeve (solid sleeve) 4 and a sleeve case 5. The fiber stub 2 is composed of a cylindrical ferrule 6 made of zirconia and an optical fiber 7 principally made of quartz glass and inserted into a through hole made at the center of the ferrule 6 and fixed therein, and this fiber stub 2 is fixed in the holder 3 in a manner such that its end portion on the side of a connection to a package (see reference numerals 104 and 115 in FIGS. 7 and 8) for optical transmission/reception (not shown) is inserted into the holder 3 under pressure, and further inserted and fitted in the tubular precision sleeve 4.

In addition, the precision sleeve 4 has a tubular configuration having a cavity hole 4h, and it, together with the fiber stub 2 fitted in its own cavity hole 4h, is inserted into the holder 3 under pressure to be fixed therein. The precision sleeve 4 can be made of zirconia, and the inner diameter of the cavity hole 4h can be set at approximately 1.251 mm. Moreover, in this precision sleeve 4, the plug ferrule 122 which is a member of the optical connector plug 130 is inserted from the opposite side to the insertion side of the fiber stub 2, thereby making the coupling between the optical connector plug 130 and the optical receptacle 1.

In other words, the precision sleeve 4 is a solid sleeve having the cavity hole 4h into which the plug ferrule 122 constituting the optical connector plug 130 is inserted from one end side and made to have an even inner diameter so as not to define a substantial gap with respect to an outer diameter of the plug ferrule 122.

Moreover, the fiber stub 2 serves as an optical propagation member inserted and fixed on the opposite side (other end side) to the insertion side of the aforesaid plug ferrule 122 in the precision sleeve 4 and it is composed of the ferrule 6 through which a second optical fiber 7 passes, with the second optical fiber 7 being optically coupled to the first optical fiber 121 of the plug ferrule 122 when the optical receptacle 1 and the optical connector plug 130 are engaged with each other.

Still moreover, the sleeve case 5 made of a metal or the like is for preventing the precision sleeve 4 from protruding at a withdrawal operation from the optical connector plug 130 (see FIG. 1C or FIG. 9) which is, for example, the other party of a connection with the optical receptacle 1, and it is inserted into the holder 3 under pressure outside the precision sleeve 4 to be integrated with this holder 3. In other words, the sleeve case 5 is located on an outer edge portion of the precision sleeve 4 for protecting and fixing the installation state of the precision sleeve 4.

In this case, in the optical receptacle 1, in particular, a length L from a tip position of the precision sleeve 4 on the insertion side of the plug ferrule 122 (more accurately, the end point of chamfered portion of an insertion side inner circumference of the precision sleeve 4: P1 in FIG. 1A) to a tip position of the fiber stub 2 (P2 in FIG. 1A) is set to be sufficiently longer than the maximum length n of extension (expansion/contraction) of the plug ferrule 122 made by the spring 123 (more accurately, length N=n+x obtained by adding, to the length n, a length x corresponding to the chamfered portion on the outer circumference of a tip portion of the plug ferrule 122), in the precision sleeve 4 as shown in FIG. 1C. Concretely, in the standard specification of the LC connector, N=approximately 3.0 at the maximum when the length x (0.51 mm at a maximum) of a chamfered portion on the tip outer circumference of the plug ferrule 122 is added thereto and, in this embodiment, L=approximately 3.4 mm) (L>N).

In other words, the solid sleeve 4 is made such that, in the cavity hole 4h, the length from the end portion (position P1 in FIG. 1A) on the insertion side of the plug ferrule 122 to the fiber stub 2 serving as an optical propagation member is set to be longer than the maximum extension length n due to the spring 123 of the optical connector plug 130.

In addition, the solid sleeve 4 is designed such that, in the cavity hole 4h, the length L from the end portion P1 on the insertion side of the plug ferrule 122 to the tip position P2 of the fiber stub 2 serving as an optical propagation member is longer than the maximum extension length n due to the spring 123 plus the length x of the chamfered portion formed at the tip portion of the plug ferrule 122.

The optical receptacle 1 constructed as mentioned above is mounted in a package 104 containing an LD element 101 and lenses 102 and 103 similar to those mentioned above with reference to FIG. 7 and it can constitute, for example, a TOSA for the SFP. Moreover, when the optical connector plug 130 shown in FIG. 5C is inserted thereinto, it can transmit the light from the LD element 101 through the optical receptacle 1, the optical connector plug 130 and an optical fiber (not shown) connected to the latter section of the optical connector plug 130.

Figure 2:
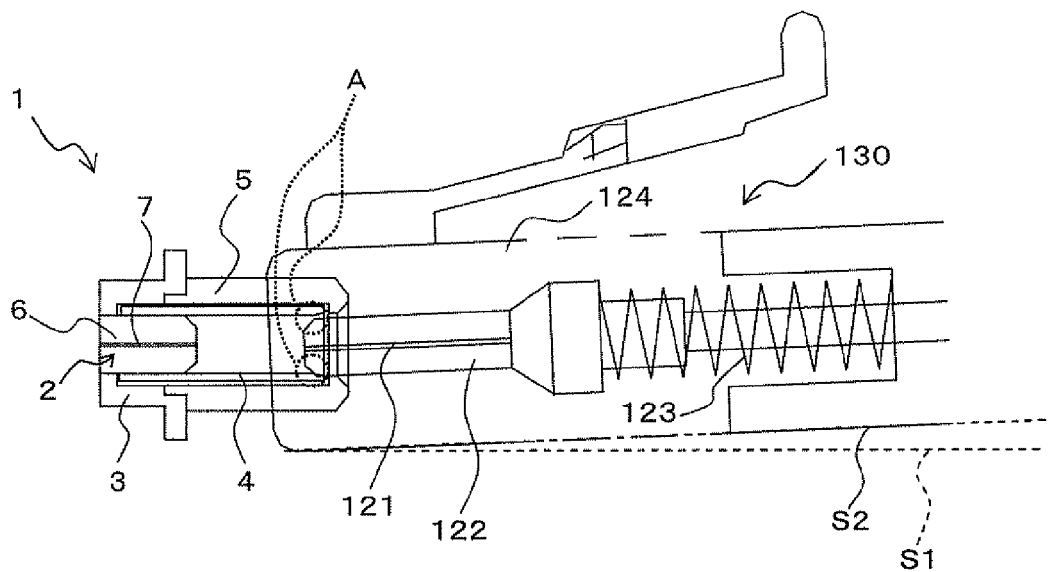
FIGS. 2 to 5 are cross-sectional views useful for explaining an operation at the engagement between an optical connector plug and an optical receptacle in the first embodiment of the present invention.

The above-mentioned optical connector plug 130 is basically inserted from the side of the insertion opening of the optical receptacle 1 by being operated by an operator. At this time, in a case in which the optical connector plug 130 is inserted into the optical receptacle 1 in an oblique direction (see solid line S2) shifted from a straight line (see dotted line S1) as shown in FIG. 2, the tip portion of the plug ferrule 122 can gnaw on an entrance portion of the precision sleeve 4 to be caught thereon. More exactly, as indicated by A in FIG. 2, the chamfer end portion on the tip outer circumference of the plug ferrule 122 gnaws on the chamfer end portion on the insertion side inner circumference of the precision sleeve 4 and it is caught thereon.

This is because the inner diameter of the precision sleeve 4 is formed to be larger by only approximately 2 μm than the outer diameters of the fiber stub 2 and the plug ferrule 122, which makes a severe condition on the engagement between the precision sleeve 4 and the plug ferrule 122.

Figure 3:
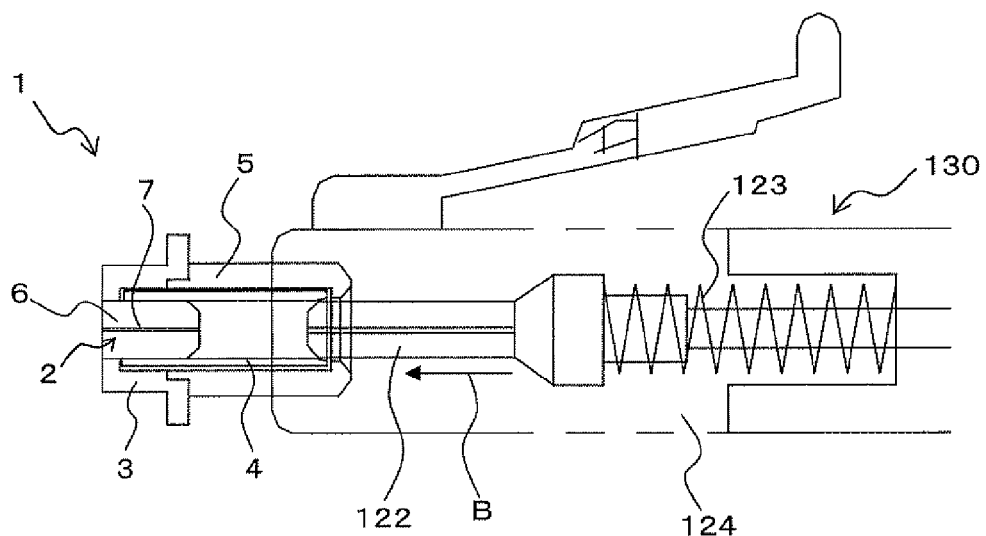

Thus, in a case in which the further insertion of the optical connector plug 130 takes place in a state where the tip portion of the plug ferrule 122 is caught on the entrance portion of the precision sleeve 4, the spring 123 in the optical connector plug 130 is contracted so that the plug ferrule 122 is pushed into the housing 124. Moreover, as shown in FIG. 3, when the insertion angle of the optical connector plug 130 is changed in a state where the spring 123 is contracted within the optical connector plug 130, the catching of the plug ferrule 122 is eliminated so that the plug ferrule 122 is inserted into the cavity hole 4h of the precision sleeve 4. At this time, the plug ferrule 122 is violently inserted into the cavity hole 4h by the force of the contracted spring 123 (see an arrow B).

In this case, in the first embodiment, as mentioned above, the length L from the tip of the precision sleeve 4 on the insertion side of the plug ferrule 122 (more accurately, the end point of chamfered portion of an insertion side inner circumference of the precision sleeve 4: see P1 in FIG. 1A) to the tip of the fiber stub 2 (see P2 in FIG. 1A) is set to be sufficiently longer than the maximum length n of extension (expansion/contraction) of the plug ferrule 122 made by the spring 123 in the optical connector plug 130. Moreover, the length L is set to be sufficiently longer than the length N obtained by adding, to the aforesaid length n, the length x of the chamfered portion on the outer circumference of the tip portion of the LC plug ferrule 122 (concretely, larger by approximately 0.4 mm).

Figure 4:
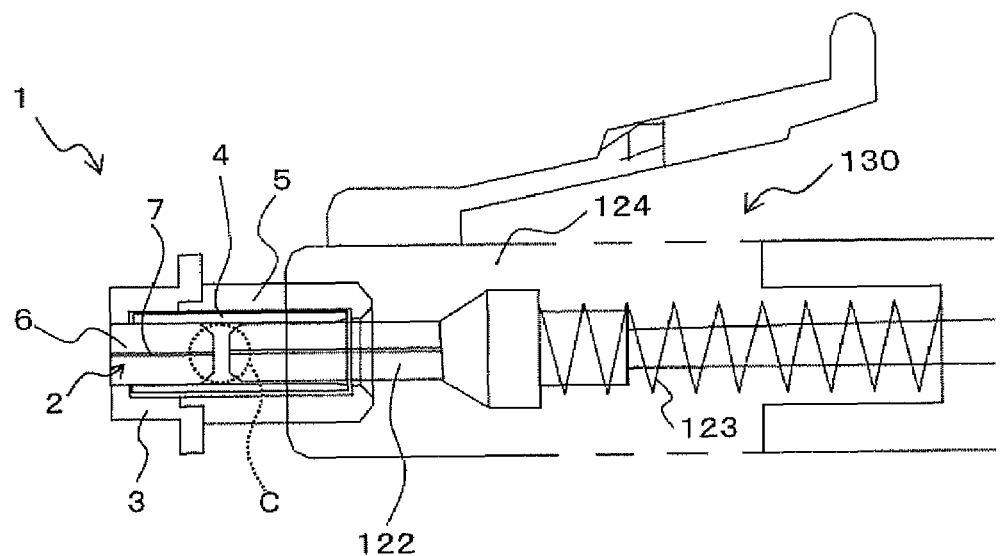

Thus, immediately after the catching state of the plug ferrule 122 is eliminated as indicated by C in FIG. 4 from the state where the plug ferrule 122 is caught on the tip portion of the precision sleeve 4 to contract the spring 123 as shown in FIG. 3, even if the spring 123 is placed into a fully expanded state, the plug ferrule 122 does not come into collision with a surface of the fiber stub 2. For this reason, in the optical receptacle 1 according to the first embodiment, the impact, the fiber stub 2 receives from the plug ferrule 122, hardly occurs at the insertion of the optical connector plug 130.

Figure 5:
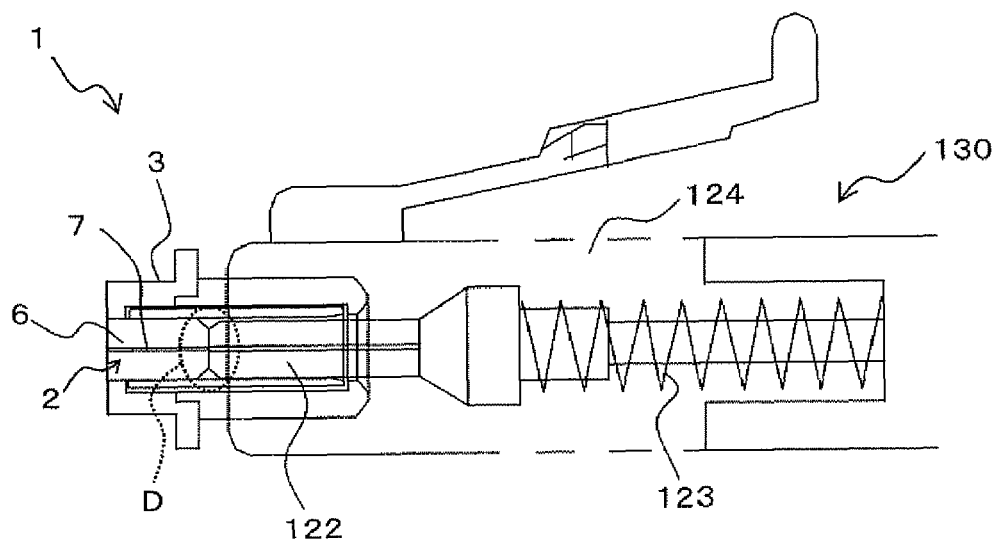

Following this, when the optical connector plug 130 is further inserted thereinto, as indicated by D in FIG. 5, the plug ferrule 122 is brought into contact with the fiber stub 2 by means of the force of the spring 123, thereby achieving the axial alignment between optical fibers 7 and 121 which lie within the fiber stub 2 and the plug ferrule 122 so as to establish the coupling therebetween.

Incidentally, if the speed of the insertion of the optical connector plug 130 is high, since the above-mentioned operations shown in FIGS. 4 and 5 continuously take place, it is considered that the plug ferrule 122 can come into collision with the surface of the fiber stub 2. However, in fact, since the speed of the insertion of the plug ferrule 122 by the force of the contracted spring 123 is sufficiently higher than the speed of the insertion of the optical connector plug 130 by the operator who is a human being, no impact takes place.

In other words, immediately after the elimination of the above-mentioned catching, as the advancing force component of the insertion of the plug ferrule 122 into the precision sleeve 4, in addition to the above-mentioned elastic force of the spring 123, there is a force component applied to the optical connector plug 130 by the operator. However, since it is considerable that the speed of the insertion of the plug ferrule 122 into the precision sleeve 4 by the operator's force is sufficiently lower than the advancing speed stemming from the elastic force of the spring 123, practically, if at least the above-mentioned length L is longer than the extension length n of the spring 123, it is possible to considerably reduce the impact the fiber stub 2 receives from the plug ferrule 122.

Figure 7:
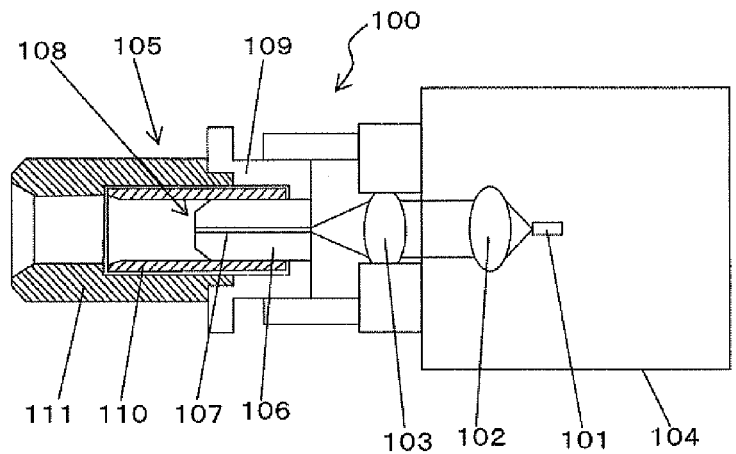
FIG. 7 is a cross-sectional view showing an example of a structure of a TOSA and optical receptacle based upon a conventional technique.
Figure 8:
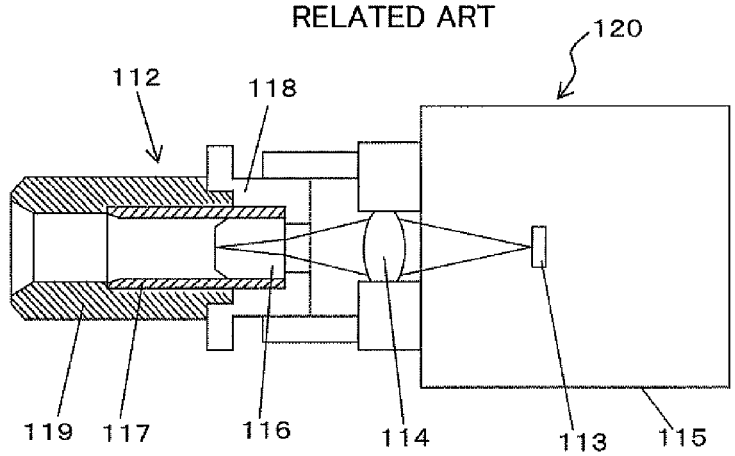
FIG. 8 is a cross-sectional view showing an example of a structure of an ROSA and optical receptacle based upon a conventional technique.

On the other hand, as a comparative example, we consider a case in which the optical connector plug 130 is inserted into the optical receptacle 105 as shown in FIG. 1B (FIG. 7). In FIG. 1B, a length M from the tip portion on the insertion side of the plug ferrule 122 in the sleeve 110 serving as a precision sleeve (more accurately, the end point of the chamfered portion on the insertion side inner circumference of the precision sleeve 110: P3 in FIG. 1B) to a position corresponding to the tip portion of the fiber stub 2 (P2 in FIG. 1B) is shorter than the above-mentioned length n or N. In FIG. 1B, the same reference numerals as those in FIG. 7 designate the corresponding parts.

In this case, since the aforesaid length M is shorter than N which is a distance the plug ferrule 122 can reach by the function of the spring 123 when the plug ferrule 122 is released from the caught state, immediately after the elimination of the catching, the plug ferrule 122 comes into collision with a surface of the fiber stub 108 due to the expansion of the spring 123.

Figure 12:
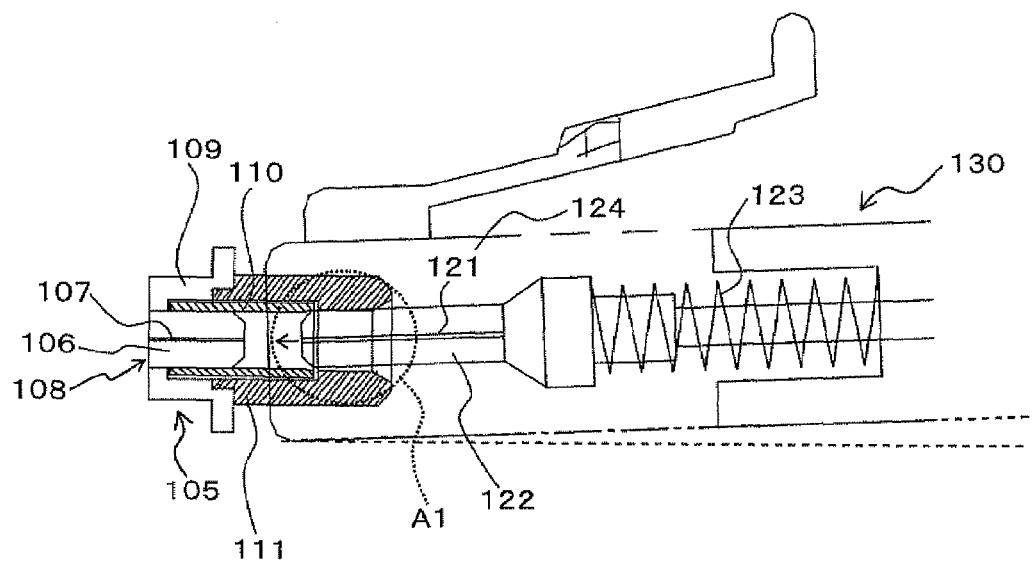
FIG. 12 is a cross-sectional view showing an operation at the engagement between an optical connector plug and an optical receptacle according to a conventional technique.
Figure 13:
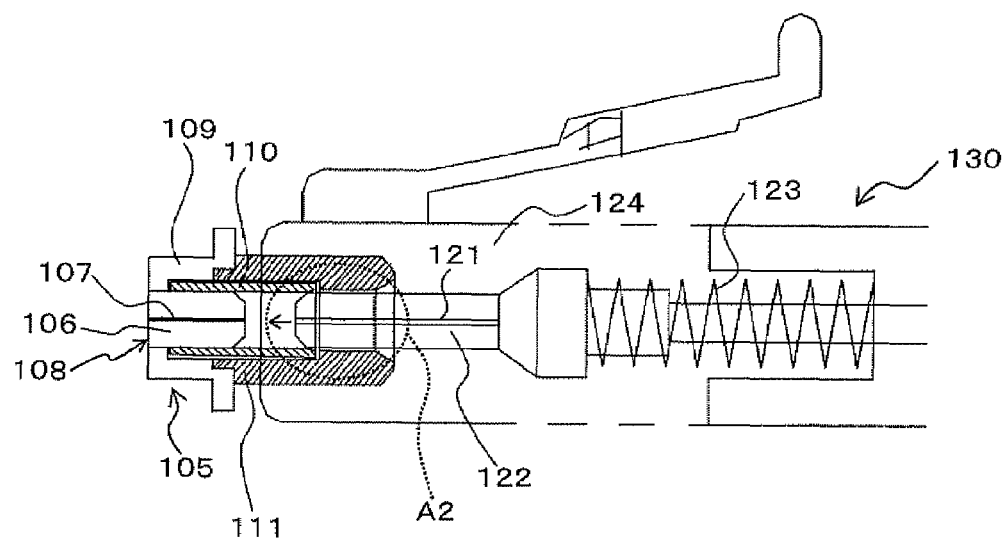
FIG. 13 is a cross-sectional view showing an operation at the engagement between an optical connector plug and an optical receptacle according to a conventional technique.
Figure 14:
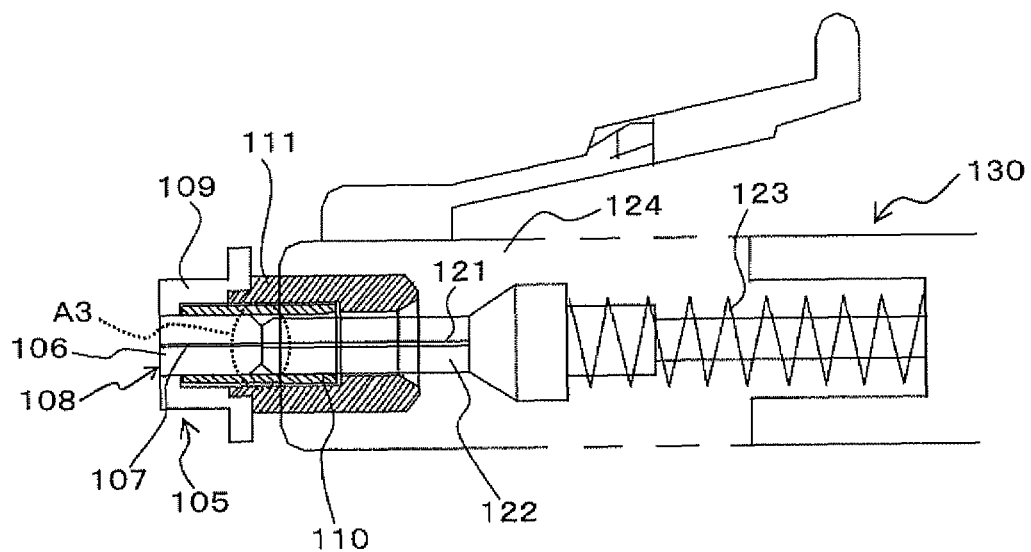
FIG. 14 is a cross-sectional view showing an operation at the engagement between an optical connector plug and an optical receptacle according to a conventional technique.

In addition, as described above with reference to FIGS. 12 to 14, a large impact exceeding 10,000 G can occur, and it is considered that, due to this large impact, the fiber stub 108 inserted under pressure settles down and precise electronic parts mounted in the interior of the package 104 suffer the degradation of performance.

On the other hand, with the above-described optical receptacle 1 according to the first embodiment, since the solid sleeve 4 is constructed such that the length L from the end portion P1 on the insertion side of the plug ferrule 122 in the cavity hole 4$h$ to the fiber stub 2 serving as an optical propagation member is set to be larger than the length N which is the maximum extension length n plus the length x of the chamfered portion formed at the tip portion of the plug ferrule 122, unlike the case shown in FIG. 1B, no impact takes place.

Thus, the first embodiment of the present invention has an advantage of providing the optical receptacle with a simple structure which can prevent a large impact from occurring when the plug ferrule 122 comes into collision with the fiber stub 2 due to the force of the spring 123 of the optical connector plug 130 at the insertion of the optical connector plug 130 while employing the precision sleeve 4 which shows less characteristic fluctuation at the application of a load to a cord.

In a case in which a TOSA employing the optical receptacle 1 according to the first embodiment was mounted in an SFP and an LC optical fiber cord was connected thereto, the optical output fluctuation of the TOSA was confirmed when a predetermined load (for example, 100 gf) was applied to the cord. In the case of the optical receptacle 1 according to the first embodiment which includes the precision sleeve 4, the optical output fluctuation was below a predetermined value (below 1 dB), so the optical receptacle 1 according to the first embodiment can be put into practical use.

Although in the first embodiment the length L from the tip of the precision sleeve 4 on the insertion side of the plug ferrule 122 (more accurately, the end point of chamfered portion of the insertion side inner circumference of the precision sleeve 4: see P1 in FIG. 1A) to the tip of the fiber stub 2 (see P2 in FIG. 1A) is set at 3.4 mm, for sufficiently obtaining the advantages of the present invention, it is preferable that the length L is set to be equal to or more than 3.1 mm. Moreover, in the case of the LC optical receptacle, since the length from the tip of the optical receptacle to the tip of the fiber stub is specified as 4.05±0.05 mm, the upper limit of L becomes 4.1 mm.

Although in the first embodiment the inner diameter of the precision sleeve 4 is set at approximately 1.251 mm, in the case of approximately 1.250 to 1.252 mm, the characteristic fluctuation at the application of a load to a cord becomes acceptable.

[b] Description of Second Embodiment

Figure 6A:
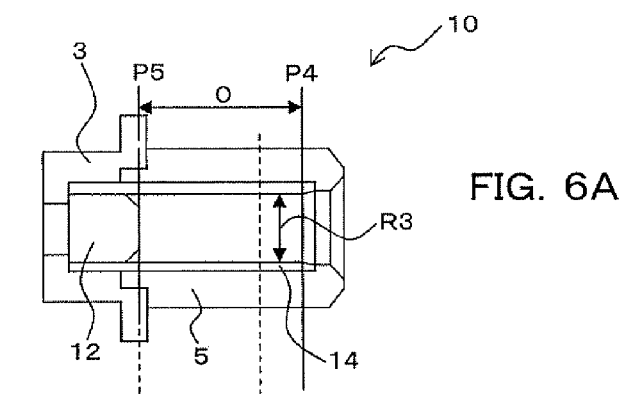
FIG. 6A is a cross-sectional view showing an optical receptacle according to a second embodiment of the present invention.
Figure 6B:
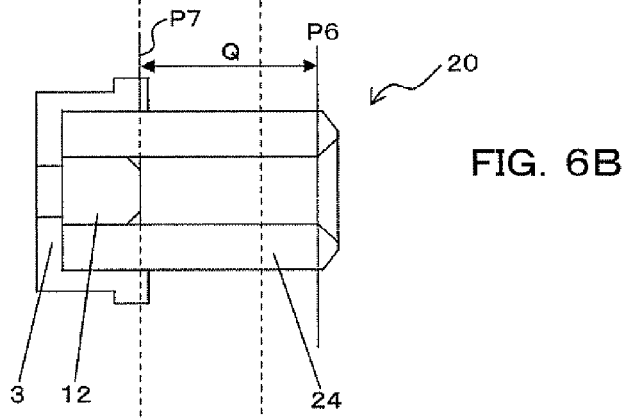
FIG. 6B is a cross-sectional view showing an optical receptacle according to a third embodiment of the present invention.
Figure 6C:
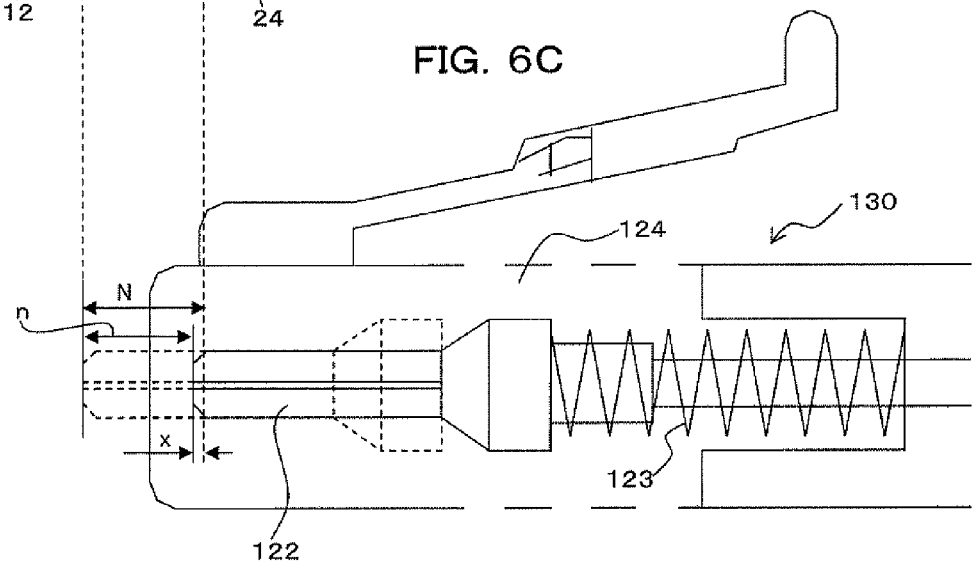
FIG. 6C is a cross-sectional view showing an expansion/contraction length of a plug ferrule in a common optical connector plug.

FIG. 6A is a cross-sectional view showing an optical receptacle 10 according to a second embodiment of the present invention, and FIG. 6C is a cross-sectional view showing an optical connector plug 130 to be inserted into the optical receptacle 10. The optical receptacle 10 according to the second embodiment differs from the above-described first embodiment (see reference numeral 1) in that a transparent glass plate 12 is provided as an optical propagation member in place of the fiber stub 2 and the precision sleeve 14 is made from a crystallized glass. Other components are basically similar to those in the first embodiment. In FIGS. 6A and 6C, the same reference numerals as those used in FIG. 1A designate almost same parts.

In the optical receptacle 10 according to the second embodiment, a glass plate 12 is fixedly secured through adhesion to an inner surface of the precision sleeve 14, and the precision sleeve 14 is fixedly secured precisely to a holder 3, made of a metal, and a sleeve case 5 to be integrated therewith. Moreover, the precision sleeve 14 in the second embodiment is made such that its inner diameter R3 is set at approximately 1.252 mm.

In addition, also in the optical receptacle 10 according to the second embodiment, as well as the above-described optical receptacle 1 according to the first embodiment, the length O from the tip of the precision sleeve 14 on the insertion side of the plug ferrule 122 (more exactly, the end point of the chamfered portion on the insertion side inner circumference of the precision sleeve 14: see P4 in FIG. 6A) to the tip of the glass member 12 (see P5 in FIG. 6A) is set to be sufficiently longer than the maximum extension length n of the plug ferrule 122 by the spring 123 (moreover, sufficiently longer than the length N=n+x obtained by adding thereto the length x of the chamfered portion on the tip outer circumference of the plug ferrule 122). Concretely, in this embodiment, the length O is set at O=3.5 mm (O>N).

Since the optical receptacle 10 according to the second embodiment is equipped with the precision sleeve 14 constructed as mentioned above, as well as the above-described first embodiment, in a case in which, at the insertion of the optical connector plug 130 into the optical receptacle 10, the plug ferrule 122 is violently inserted thereinto by the elastic force of the spring 123 because the tip portion of the plug ferrule 122 caught on the entrance portion of the precision sleeve 14 is released from the caught state, the plug ferrule 122 does not come into collision with the glass member 12, thus preventing the occurrence of a large impact.

As described above, the second embodiment of the present invention also has an advantage of providing the optical receptacle 10 with a simple structure which can prevent a large impact from occurring when the plug ferrule 122 comes into collision with the glass plate 12 due to the force of the spring 123 of the optical connector plug 130 at the insertion of the optical connector plug 130 while employing the precision sleeve 14 which shows less characteristic fluctuation at the application of a load to a cord.

In a case in which an ROSA employing the optical receptacle 10 according to the second embodiment was mounted in an SFP and an LC optical fiber cord was connected thereto, the reception sensitivity fluctuation of the ROSA was confirmed when a predetermined load (for example, 100 gf) was applied to the cord. Owing to the employment of the precision sleeve 14, the reception sensitivity fluctuation was below a predetermined value (below 1 dB), so the optical receptacle 10 according to the second embodiment can be put into practical use.

In addition, although in the second embodiment the length O from the tip of the precision sleeve 14 on the insertion side of the plug ferrule 122 (more accurately, the end point of chamfered portion of the insertion side inner circumference of the precision sleeve 14: see P4 in FIG. 6A) to the tip of the glass member 12 (see P5 in FIG. 6A) is set at 3.5 mm, for sufficiently obtaining the advantages of the present invention, it is preferable that at least the length O is set to be 3.1 mm or more. Moreover, in the case of the LC optical receptacle, since the length from the tip of the optical receptacle to the tip of the fiber stub is specified as 4.05±0.05 mm, the upper limit of O becomes 4.1 mm.

Although in the second embodiment the inner diameter of the precision sleeve 14 is set at approximately 1.252 mm, in the case of approximately 1.250 to 1.252 mm, the characteristic fluctuation at the application of a load to a cord becomes acceptable.

[c] Description of Third Embodiment

FIG. 6B is a cross-sectional view showing an optical receptacle 20 according to a third embodiment of the present invention. As well as the above-described first and second embodiments, the optical receptacle 20 according to the third embodiment is also applicable as an optical receptacle for an LC connector for use in a TOSA and ROSA which are mounted in a pluggable type optical transceiver module such as an SFP or XFP or other devices, and it can accept a terminal member such as the optical connector plug 130 shown in FIG. 6C for optical coupling.

The optical receptacle 20 according to the third embodiment differs from the above-described second embodiment (see reference numeral 1) in that the members serving as the precision sleeve 14 and the sleeve case 5 are constructed as an integral (one-piece) precision sleeve 24 made from a single member. Other components are basically similar to those in the second embodiment. In FIG. 6B, the same reference numerals as those used in FIGS. 1A and 6A designate almost same parts.

Moreover, on an inner surface of the integral precision sleeve 24, a transparent glass plate 12 similar to that in the above-described second embodiment is fixed by means of adhesion. Still moreover, the (bared) integral precision sleeve 24 is inserted into a holder 3 under pressure to be integrated with each other. Thus, with the optical receptacle 20 according to the third embodiment, it is possible to reduce the number of parts in comparison with the above-described embodiments (see reference numerals 1 and 10). The integral precision sleeve 24 is made of zirconia, and its inner diameter can be set at, for example, approximately 1.250 mm.

Still moreover, also in the case of the optical receptacle 20 according to the third embodiment, the length Q from the tip of the integral precision sleeve 24 on the plug ferrule insertion side (more exactly, the end point of the chamfered portion on the insertion side inner circumference of the integral precision sleeve 24: see P6 in FIG. 6B) to the tip of the glass member 12 (see P7 in FIG. 6B) is set to be sufficiently longer than the maximum extension length n of the plug ferrule 122 of the optical connector plug 130 by the spring 123 (moreover, sufficiently longer than the length N=n+x obtained by adding thereto the length x of the chamfered portion on the tip outer circumference of the plug ferrule 122).

Yet moreover, since the optical receptacle 20 according to the third embodiment employs the integral precision sleeve 24 in which the members serving as a precision sleeve and a sleeve case are integrated with each other as a single member, the length Q from the tip of the integral precision sleeve 24 on the insertion side of the plug ferrule 122 (more exactly, the end point P6 of the chamfered portion on the insertion side inner circumference of the integral precision sleeve 24) to the tip position P7 of the glass member 12 can be more lengthened in comparison with the optical receptacles 1 and 10 according to the first and second embodiments.

Concretely, as shown in FIG. 6, it can be set to be sufficiently longer than the maximum extension length n of the plug ferrule 122 by the spring 123 (moreover, sufficiently longer than the length N=n+x obtained by adding thereto the length x of the chamfered portion on the tip outer circumference of the plug ferrule 122). For example, the length Q can be set at approximately Q=3.9 mm (Q>>N).

In addition, since the optical receptacle 20 according to the third embodiment employs the integral precision sleeve 24 thus constructed, as well as the above-described first and second embodiments, even in a case in which, when the optical connector plug 130 is inserted into the optical receptacle 20, the plug ferrule 122 is violently inserted thereinto by the elastic force of the spring 123 because the tip portion of the plug ferrule 122 caught on the entrance portion of the integral precision sleeve 24 is released from the caught state, the plug ferrule 122 does not come into collision with the glass member 12, thus preventing the occurrence of a large impact.

As described above, the third embodiment of the present invention also has an advantage of providing the optical receptacle 20 with a simple structure which can prevent a large impact from occurring when the plug ferrule 122 comes into collision with the glass plate 12 due to the force of the spring 123 of the optical connector plug 130 at the insertion of the optical connector plug 130 while employing the precision sleeve 14 which shows less characteristic fluctuation at the application of a load to a cord. In addition, it is possible to reduce the number of parts in comparison with the above-described first and second embodiments.

In a case in which an ROSA employing the optical receptacle 20 according to the third embodiment was mounted in an SFP and an LC optical fiber cord was connected thereto, the reception sensitivity fluctuation of the ROSA was confirmed when a predetermined load (for example, 100 gf) was applied to the cord. In this case, the reception sensitivity fluctuation was below a predetermined value (below 1 dB), so the optical receptacle 20 according to the third embodiment can be put into practical use.

Moreover, although in the aforesaid optical receptacle 20 according to the third embodiment the transparent glass plate 12 is used as an optical propagation member fixedly secured to an end portion of the integral precision sleeve 24 opposite to the insertion side of the plug ferrule 122, the present invention is not limited to this, but the fiber stub 2 shown in FIG. 1A is also employable, and the aforesaid optical receptacle 20 is also applicable to a TOSA.

Still moreover, although in the third embodiment the length Q from the tip of the integral precision sleeve 24 on the plug ferrule 122 insertion side (more exactly, the endpoint of the chamfered portion on the insertion side inner circumference of the integral precision sleeve 24: see P6 in FIG. 6B) to the tip of the glass member 12 (see P7 in FIG. 6B) is set at 3.9 mm, for sufficiently achieving the advantages of the present invention, it is preferable that at least the length Q is set at 3.1 mm or more. Moreover, in the case of the LC optical receptacle, since the length from the tip of the optical receptacle to the tip of the fiber stub is specified as 4.05±0.05 mm, the upper limit of Q becomes 4.1 mm.

Although in the third embodiment the inner diameter of the precision sleeve 14 is set at approximately 1.250 mm, in the case of approximately 1.250 to 1.252 mm, the characteristic fluctuation at the application of a load to a cord becomes satisfactory.

[d] Others

It should be understood that the present invention is not limited to the above-described embodiments, and that it is intended to cover all changes and modifications of the embodiments of the invention herein which do not constitute departures from the spirit and scope of the invention.

The disclosure of the embodiments enables a person skilled in the art to manufacture the apparatus according to the present invention.

What is claimed is:

1. An optical module, comprising
an optical receptacle including a first ferrule through which a first optical fiber passes and a solid sleeve having a cavity hole, the first ferrule being inserted from a first end of the solid sleeve and fixed in the cavity hole;
a terminal member including a second ferrule through which a second optical fiber passes, an elastic body connected to the second ferrule, and a plug housing, the second ferrule being movable in the plug housing; wherein,
when the optical receptacle is connected to the terminal member, the second ferrule is inserted in the solid sleeve from a second end of the solid sleeve and contacts the first ferrule with a postural maintenance force by the elastic body, and the first optical fiber and the second optical fiber are optically connected,
a distance between the second end of the solid sleeve and the first ferrule is long enough that the second ferrule does not collide with the first ferrule when the second ferrule is released from a caught state at the second end of the solid sleeve and the elastic body pushes the second ferrule through the solid sleeve to the position of maximum extension stroke thereof.

2. The optical module according to claim 1, wherein the solid sleeve is formed such that the length from the second end of the cavity hole to the first ferrule is longer than the maximum extension length due to the elastic body plus a length of a chamfered portion formed at a tip portion of the second ferrule.

3. The optical receptacle according to claim 1, wherein an inner diameter of the cavity hole and an outer diameter of the second ferrule is approximately the same, and the second ferrule can propagate through the cavity hole only when the first ferrule and the second ferrule are in a almost same direction.

4. The optical module according to claim 1, wherein the first ferrule is made with a glass member.

5. The optical module according to claim 1, wherein the optical receptacle includes a sleeve case configured to protect and fix the solid sleeve on an outer edge portion of the solid sleeve.

6. The optical module according to claim 5, wherein the solid sleeve and the sleeve case are integrated with each other as a single unit.

7. The optical module according to claim 1, wherein the solid sleeve is made of zirconia or crystallized glass.

8. The optical module according to claim 1, wherein the optical receptacle is made to be of an LC type, and a length from a chamfer end point of the second end portion of the cavity hole to the first ferrule is set to be in a range from 3.1 mm to 4.1 mm.

9. The optical module according to claim 1, wherein the optical receptacle is made to be of an LC type, and an inner diameter of the cavity hole in the solid sleeve is set to be in a range from 1.250 mm to 1.252 mm.

10. The optical module according to claim 1, wherein the optical receptacle is mounted in an optical transceiver module which carries out transmission/reception of an optical signal.

* * * * *